United States Patent [19]

Maguire et al.

[11] Patent Number: 5,331,661
[45] Date of Patent: Jul. 19, 1994

[54] METHOD AND APPARATUS FOR CONTROLLING ELECTROSLAG REMELTING

[75] Inventors: Michael C. Maguire, Tijeras; Frank J. Zanner, Sandia Park; Brian K. Damkroger, Albuquerque; Mark E. Miszkiel, Tijeras; Eugene A. Aronson, Albuquerque, all of N. Mex.

[73] Assignee: Sandia Corporation, Albuquerque, N. Mex.

[21] Appl. No.: 843,870

[22] Filed: Feb. 27, 1992

[51] Int. Cl.⁵ .......................................... H05B 7/156
[52] U.S. Cl. .................................... 373/105; 373/104; 373/108
[58] Field of Search ............................ 373/47–50, 373/70, 102, 104, 105, 108; 356/5

[56] References Cited

U.S. PATENT DOCUMENTS

| | | | |
|---|---|---|---|
| 3,749,804 | 7/1973 | Thomas | 373/49 |
| 3,890,457 | 6/1975 | Fain et al. | 13/13 |
| 4,027,233 | 5/1977 | Shmakov et al. | 324/34 R |
| 4,047,555 | 9/1977 | Lamarque | 164/52 |
| 4,075,414 | 2/1978 | Thomas | 13/13 |
| 4,108,235 | 8/1978 | Paton et al. | 164/252 |
| 4,131,754 | 12/1978 | Roberts | 13/34 |
| 4,194,078 | 3/1980 | Thomas | 13/9 ES |
| 4,241,995 | 12/1980 | Takahama | 356/5 |
| 4,262,159 | 4/1981 | Grof et al. | 13/9 ES |
| 4,291,744 | 9/1981 | Medovar et al. | 164/509 |
| 4,296,269 | 10/1981 | Stewart et al. | 373/102 |
| 4,303,797 | 12/1981 | Roberts | 13/13 |
| 4,395,771 | 7/1983 | Medovar et al. | 373/49 |
| 4,435,631 | 3/1984 | Drouet et al. | 373/105 |
| 4,476,565 | 10/1984 | Rashev et al. | 373/50 |
| 4,483,708 | 11/1984 | Gfrerer et al. | 75/10 R |
| 4,569,056 | 2/1986 | Veil, Jr. | 373/70 |
| 4,620,308 | 10/1986 | Persson et al. | 373/105 |
| 4,663,764 | 5/1987 | Bretthauer et al. | 373/104 |
| 4,669,087 | 5/1987 | Rasheva et al. | 373/50 |
| 4,677,643 | 6/1987 | Dicks | 373/105 |
| 4,742,528 | 5/1988 | Stenzel | 373/70 |
| 4,953,177 | 8/1990 | Tommaney et al. | 373/68 |
| 5,204,872 | 4/1993 | Staib et al. | 373/104 |

Primary Examiner—Bruce A. Reynolds
Assistant Examiner—Tu Hoang
Attorney, Agent, or Firm—George H. Libman

[57] ABSTRACT

Method and apparatus for controlling electrode immersion depth in an electroslag remelting furnace. The phase difference of the alternating current circuit established in the furnace is calculated in real time and employed to more accurately control immersion depth than possible with voltage-swing systems.

20 Claims, 6 Drawing Sheets

METHOD AND APPARATUS FOR CONTROLLING ELECTROSLAG REMELTING

GOVERNMENT RIGHTS

The U.S. Government has a paid-up license in this invention and the right in limited circumstances to require the patent owner to license others on reasonable terms.

BACKGROUND OF THE INVENTION

1. Field of the Invention (Technical Field)

The present invention relates to the control of electroslag remelting (ESR) furnaces, which are used to process metals and alloys to improve material quality. An electrode of the material to be processed is melted by the ESR process to produce a refined ingot. The process is characterized by the passage of current between the electrode and ingot through a molten, ionized slag. This slag is sufficiently heated by passage of current (Joule heating) so that the electrode is melted as it is immersed in the slag. The molten metal drips from the electrode through the slag and forms an ingot below.

2. Background Art

The ESR process is traditionally carried out commercially with alternating current (AC), and most control processors rely on RMS (root mean square) values of voltage and current to provide process information, while others gather information on the resistivity or conductivity of the AC circuit. Control of an ESR furnace is commonly achieved by regulating the voltage between the electrode and the ingot for a given current by moving the electrode either up or down in the slag. In most instances, the variation of voltage around the average voltage, known as voltage swing, is used to position the electrode. By regulating the voltage swing, the immersion depth of the electrode in the slag is attempted to be kept constant. However, it is known that the control strategies currently used in industry do not provide for accurate control of electrode immersion depth, resulting in imperfections in the ingot being produced.

Since ingot quality is tied to establishing and maintaining quasi-steady state melting conditions, the primary function of controllers currently in use is to keep the electrode immersed at as shallow a depth as possible because voltage swing only becomes significant under such a condition. Consequently, only at shallow immersion depths (approximately less than 25 mm) can voltage swing control become useful. However, because the voltage signal is inherently noisy, the controller operates over a relatively wide range of voltages which would fall within the range of the voltage swing. A controller based on this strategy has a major drawback: it can only control the process reliably when the electrode is very near the slag surface.

References relating to the general state of the art of electroslag remelting include the following: U.S. Pat. No. 4,027,233, to Shmakov et al., discloses a contactless inductance interface pickup, which in electroslag remelting may be used to detect the location of the interface between slag and air. U.S. Pat. No. 4,047,555, to Lamarque, discloses means for transporting consumable electrodes into and out of the slag in an electroslag remelting system. U.S. Pat. No. 4,108,235, to Paton et al., discloses an electroslag remelting apparatus incorporating a cooled mold assembly enabling the making of hollow ingots. U.S. Pat. No. 4,131,754, to Roberts, is concerned with providing for an initial electrode melt rate higher than a later, steady state melt rate in both electroslag and arc remelting furnaces. U.S. Pat. No. 4,262,159 discloses an electroslag remelting apparatus having a particular power arrangement. U.S. Pat. No. 4,291,744, to Medovar et al., discloses an electroslag remelting apparatus capable of simultaneously remelting a plurality of electrodes. U.S. Pat. No. 4,953,177, to Tommaney et al., discloses a system for controlling the atmosphere above the slag bath of an electroslag remelting furnace.

The references disclosing use of particular control parameters in analyzing and controlling electrode depth in electroslag remelting include: U.S. Pat. No. 3,890,457, to Fain et al., discloses a typical prior art device for controlling electroslag remelting. As noted at col. 1, lines 43-50, the device considers only the following parameters: remelting current, voltage, resistance of slag, and input power. U.S. Pat. No. 4,075,414, to Thomas, discloses an apparatus for regulating electrode immersion depth by measuring system resistance and the change of resistance over time. U.S. Pat. No. 4,194,078, to Thomas, suggests regulating immersion depth by measuring conductance of the slag blanket based upon a discovered linear relationship between the conductance and immersion depth. U.S. Pat. No. 4,303,797, to Roberts, discloses an electrode drive speed control system which, for electroslag remelting furnaces, determines the drive speed in part on the voltage across the slag bath or the magnitude of current through it (col. 3, lines 16-35). U.S. Pat. No. 4,476,565, to Rashev et al., discloses a system for maintaining an electrode between two depths by detecting arc discharges which occur when the electrode depth is outside the range. U.S. Pat. No. 4,483,708, to Gfrerer et al., discloses a system for determining electrode immersion depth based upon the weight of the immersed portion of the electrode, which is determined from the length of the electrode above the slag and the total remaining weight of the electrode. U.S. Pat. No. 4,569,056, to Veil Jr., also discloses a system for controlling melt rate based upon monitoring decreases in weight of the electrode over time. U.S. Pat. No. 4,669,087, to Rasheva et al., discloses another system controlling electrode immersion depth via detection of arc discharges.

It has heretofore been unknown to control electroslag remelting based upon electrical phase difference of the AC circuit in an ESR furnace. The variation in the phase difference of the AC circuit in electroslag remelting suffers from much less variation for a given electrode position than does the voltage for the same position, providing the ability to more accurately control the remelting process and to employ greater immersion depths with the present invention.

SUMMARY OF THE INVENTION (DISCLOSURE OF THE INVENTION)

The present invention is of a method and apparatus for controlling the immersion depth of an electrode in a slag pool of an electrode melting furnace, in particular in an electroslag remelting furnace.

The invention comprises: immersing an electrode in the slag pool; completing an alternating current circuit through the electrode and the slag pool; measuring at time intervals a measured phase difference of the alternating current circuit; determining an adjustment of a furnace output control signal according to changes of the measured phase difference over time; and adjusting the furnace output control signal according to the determined adjustment of the furnace output control signal and thereby controlling the electrode immersion depth.

In the preferred embodiment, measuring the phase difference comprises collecting cross power spectrum data and determining imaginary and real components of the data. Determining an adjustment to a furnace output control signal comprises comparing the measured phase difference to a predetermined phase difference and, optionally, adjusting the predetermined phase difference at predetermined time intervals to provide for desired changes in the furnace output control signal. Preferably, the adjustments are determined by an adaptive bang-bang control algorithm, as disclosed below in the specification. Adjusting the furnace output control signal can comprise adjusting a voltage set point signal or adjusting an electrode drive velocity signal. Adjusting the control signal may, if desired, maintain the electrode immersion depth at a depth greater than 25 mm. Determining the adjustments is performed by software or firmware in conjunction with a central processing unit operably connected to a control panel of the electrode melting furnace.

A primary object of the present invention is to provide a system whereby electrode immersion depth can be more accurately controlled.

Another object of the present invention is to provide a system in which electrode immersion depth may be deeper than with systems relying on control by voltage swing.

A primary advantage of the present invention is that phase difference has relatively small response variations for given electrode immersion depths than control parameters heretofore in use.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

Figure 1:
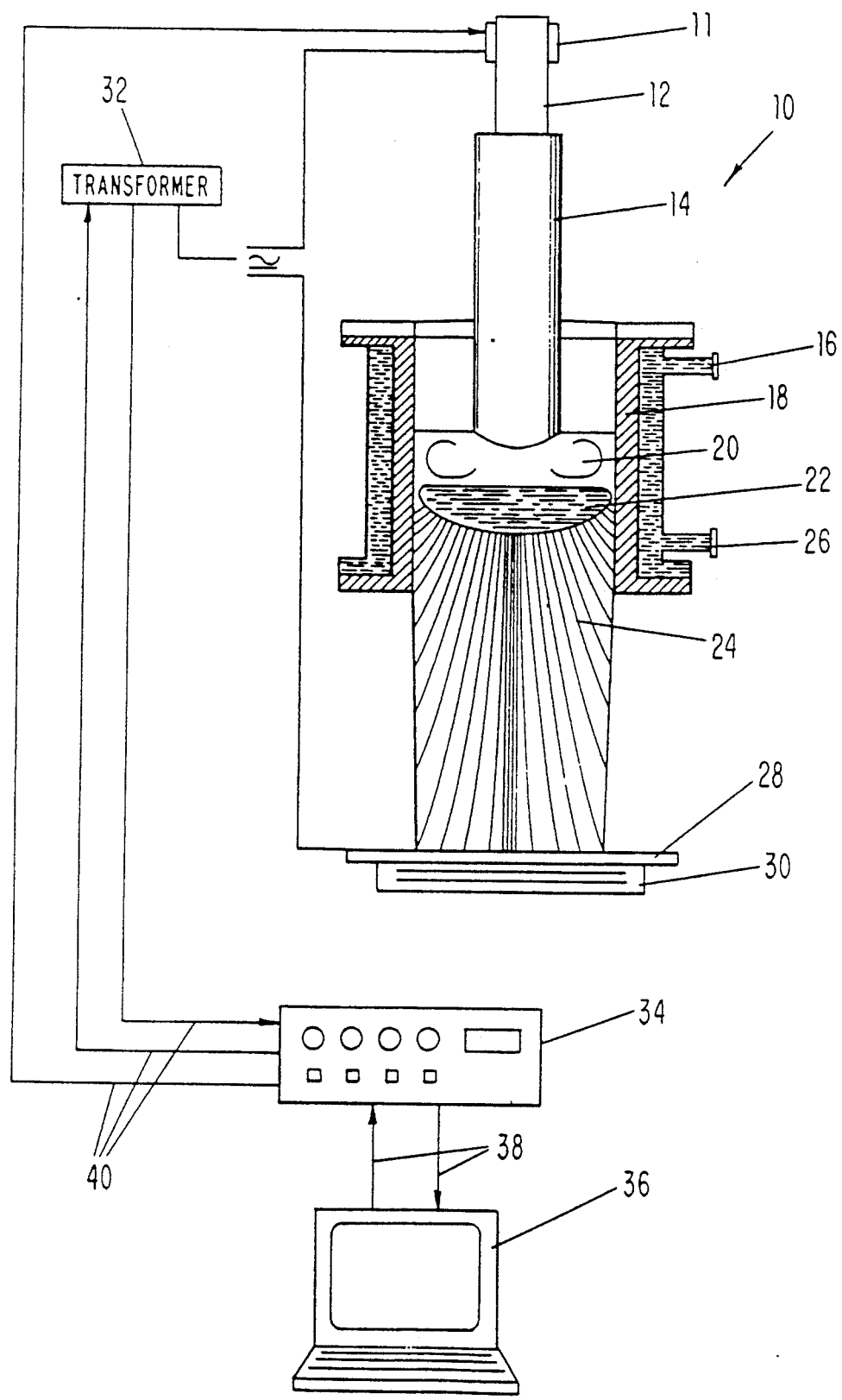
FIG. 1 is a block diagram of the preferred control apparatus of the invention.

DESCRIPTION OF THE PREFERRED EMBODIMENT (BEST MODE FOR CARRYING OUT THE INVENTION)

The present invention provides a method and an apparatus for accurately controlling electrode immersion depth during electroslag remelting of an electrode. In real time, the invention computes the phase difference of the AC circuit of the electroslag remelting, changes in which can be used to accurately control the immersion depth of the electrode in the slag pool. For purposes of the specification and claims, "slag" is defined as any molten substance into which an electrode is immersed. Use of the phase difference provides more reliable information on immersion depth than use of data heretofore gathered during electroslag remelts.

The present invention examines the voltage and current waveforms rather than their RMS values as control parameters, and extracts information relating to their spectral content. In particular, the phase difference between the voltage and current at the most intense frequency (ordinarily 60 Hz) is examined for information relating to the electrode immersion depth. The preferred apparatus of the present invention combines output controls of existing mechanical systems with novel feedback from the ESR electrical signal, namely the phase difference, to control the position of the electrode in ESR furnaces.

Phase difference is a property of AC circuits which contain reactance other than pure resistance. In general, the impedance of an AC system (including that of an electroslag remelt) is comprised of inductive reactance, capacitative reactance, and resistance. The relationship is govered by the following equation (Marks' Standard Handbook for Mechanical Engineers 15-3 (8th ed. 1978)):

$$Z = \frac{E}{I} = \sqrt{R^2 + (X_L - X_C)^2}$$

where:
E = electromotive force (volts)
I = current (amps)
R = resistance (ohms)
$X_L$ = inductive reactance (ohms)
$X_C$ = capacitive reactance (ohms)
Inductive reactance is defined as:

$$X_L = 2\pi f L$$

where:
f = frequency (Hz)
L = self inductance (Henries)
Capacitive reactance is defined as:

$$X_C = \frac{1}{(2\pi f C)}$$

where:
C = capacitance (Farads)
By variations in resistance, inductive reactance, or capacitative reactance, the phase difference between voltage and current varies according to the following equation (Marks' Standard Handbook for Mechanical Engineers 15-22 (8th ed. 1978)):

$$\tan \theta = \frac{(X_L - X_C)}{R} = \frac{2\pi f L - \frac{1}{(2\pi f C)}}{R}$$

where:
$\theta$ = phase difference between voltage and current (radians)

By analyzing phase difference relationships during furnace operation, its viability as a control parameter has been determined. Phase difference $\theta$ can be calculated in real time by performing a cross-power spectrum of voltage and current (for example, 512 point data sets) and deriving phase difference as follows (Random Data: Analysis and Measurement Procedures 120-25 (2d ed. 1986)):

$$\tan^{-1} \theta = \frac{\text{Imaginary}}{\text{Real}}$$

where:
Imaginary = the imaginary components of the cross power spectrum
Real = the real components of the cross power spectrum Data have shown (see Examples, below) that in comparison to voltage swing signals, the phase difference $\theta$ suffers from much less variation than the voltage for a given electrode position. This data points to the reason why reliable electrode immersion depth control is extremely difficult with voltage or voltage swing control. The response variation in the voltage signal is so great that the electrode position cannot be reliably extracted from the voltage signal. Conversely, phase difference measurement has much less response variation and therefore yields more reliable information about electrode immersion depth.

Phase difference measurements may be used in a number of control strategies, but two are currently preferred. The first, less preferred, option is to use phase difference as a secondary signal for incorporation into an existing voltage or voltage swing based control system. In this strategy, the measured phase difference signal is compared to a specified set point value or function. The difference between programmed and measured values is used to modify the voltage set point signal to reflect changing conditions during the melting operation. This control strategy has the advantage of ease of interface with and retrofit to existing industrial control systems.

The second, and more preferred, method of phase difference based control is to directly drive the electrode based on the phase difference measurements. Although any desired control algorithm may be used, an "adaptive bang-bang" algorithm works well because of advantages in noisy environments. In the present invention, the adaptive bang-bang algorithm is preferably applied as follows. The response signal (phase difference) value is compared to a specified set point or function value. The sign of the deviation is determined and used to deflect the output control signal (electrode drive velocity) up or down from the baseline by a specified amount. This specified amount, the "bang," is chosen to be large enough to perturb the output control signal by an amount greater than half the width of the existing noise band. Simultaneously, the baseline control signal is "adapted" up or down by a small amount that is a specified function of the "bang." The algorithm may be written as follows:

$$S = (\phi_m - \phi_p)/|(\phi_m - \phi_p)|$$

$$CS_o = CS_b + (S)(B)$$

and $$CS_{b1} = CS_b + (S)f(B)$$

where
$\phi_m$ = measured phase difference value (step n)
$\phi_p$ = programmed phase difference value (step n)
$CS_o$ = output control signal (step n+1)
$CS_b$ = baseline control signal (step n)
B = "Bang," or deviation in output control signal
$CS_{b1}$ = new baseline control signal (step n+1) and
f(B) = function of (B) by which the baseline control signal is adapted FIG. 1 illustrates the preferred apparatus 10 of the present invention. The electroslag remelting furnace comprises electrode clamp 11, stinger 12, electrode 14, cooling water in 16, mold 18, slag pool 20, molten metal pool 22, ingot 24, cooling water out 26, starting plate 28, water cooling 30, and transformer 32. The furnace itself is conventional.

The system further comprises control panel 34 and control computer 36, which are operably connected by data pathways 38. Control panel 34 is operably connected to the ESR furnace by electrical pathways 40 which permit issuance of commands to control positioning of electrode 14 and commands to transformer 32 to alter the supplied current, and which permit data to be gathered from the transformer about the AC circuit formed by the ESR furnace, including RMS voltage, resistance, and current, as well as cross power spectrum data from other points in the circuit for calculation of phase difference. Existing control panels do not provide for gathering of cross power spectrum data, but those skilled in the art can so alter or supplement prior art control panels. Control panel 34 preferably also receives, as is well known, data concerning electrode position, electrode weight, electrode drive speed, mold position (for furnaces with moving molds), mold drive speed (also for furnaces with moving molds), and water flow rates.

Control computer 36, preferably comprising a memory, processor, input devices (e.g, keyboard and mouse), and display screen, has software or firmware implementing the preferred control algorithm discussed above. Control computer 36 preferably calculates in real time the phase difference of the ESR AC circuit and compares the measured phase difference with a predetermined phase difference known to correctly position the electrode at a desired depth. In cases where it is desired to change the desired depth of the electrode during the course of a remelt, the predetermined (target) phase difference will change accordingly at the appropriate times according to a predetermined function. For example, as disclosed by U.S. Pat. No. 4,131,754, to Roberts, one may wish to provide for an initial electrode melt rate higher than a later, steady state melt rate in both electroslag and arc remelting furnaces, which may in part be accomplished by changes in target electrode depths. Control computer 36 may be implemented within control panel 34, rather than as a physically separate entity.

EXAMPLES (INDUSTRIAL APPLICABILITY)

The invention is further illustrated by the following non-limiting examples.

EXAMPLE 1

Figure 2:
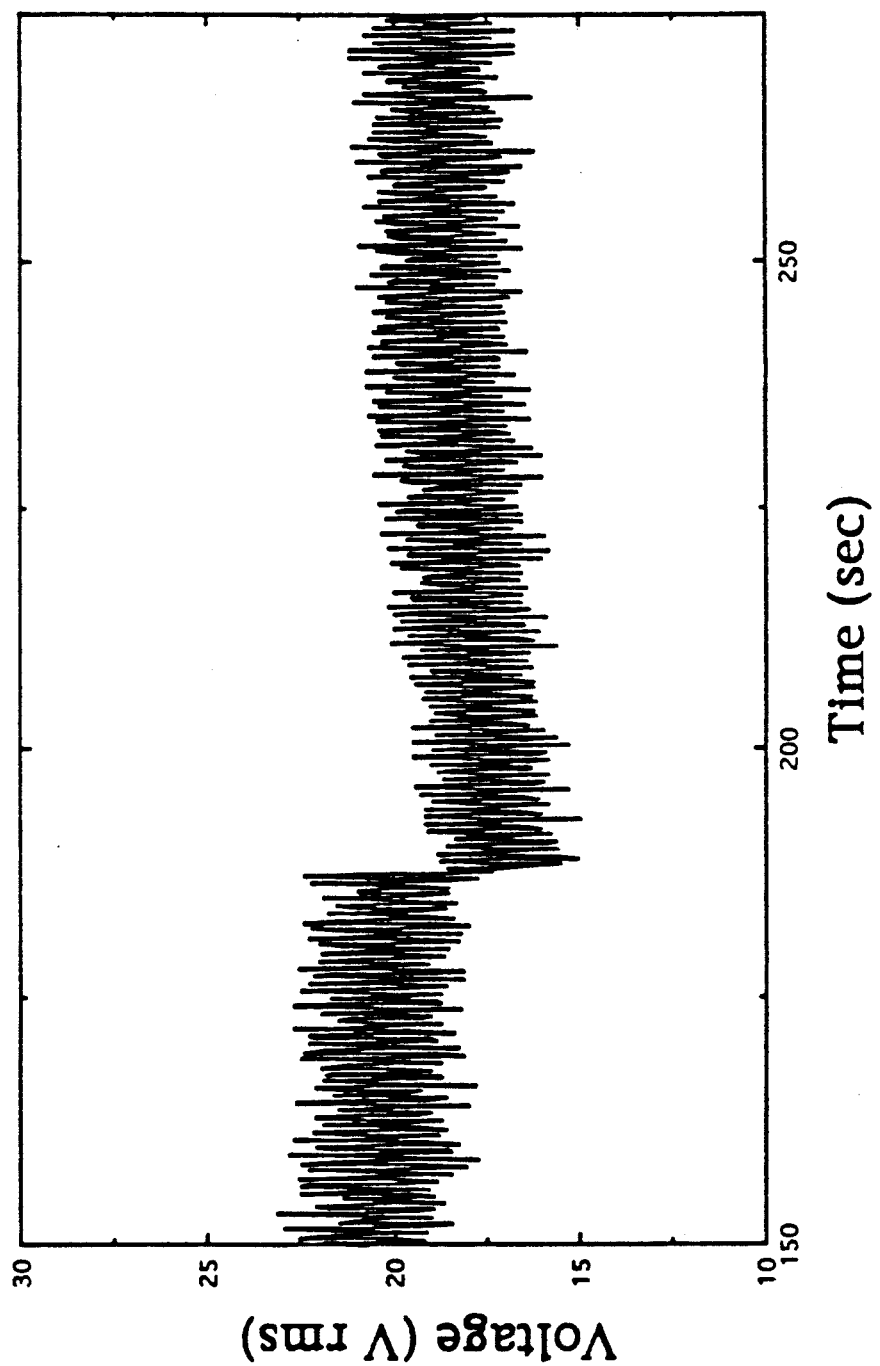
FIG. 2 is a graph showing change of RMS voltage over time for a typical electroslag remelt.
Figure 3:
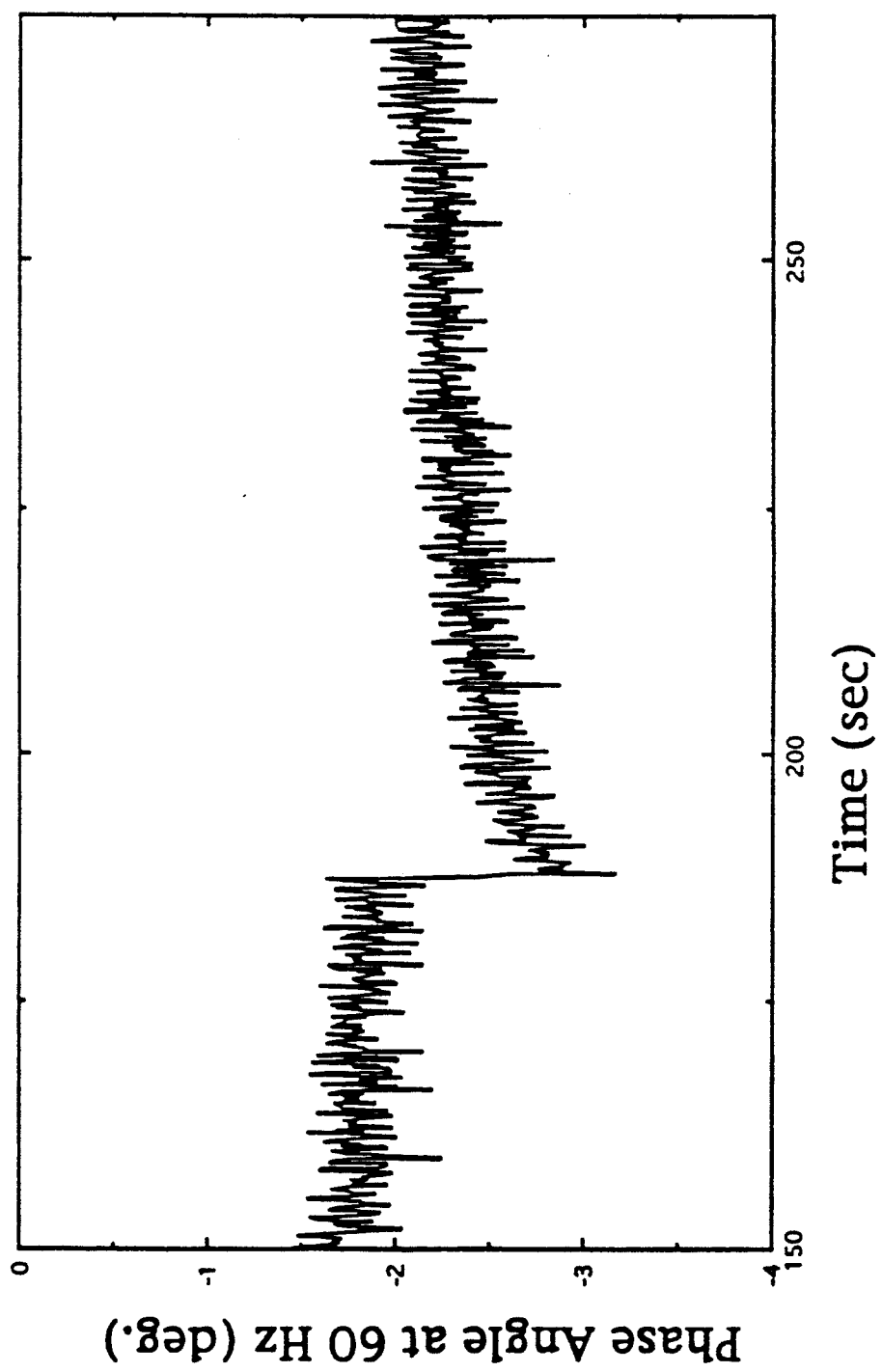
FIG. 3 is a graph showing change of phase difference over time for the same electroslag remelt as in FIG. 2.
Figure 4:
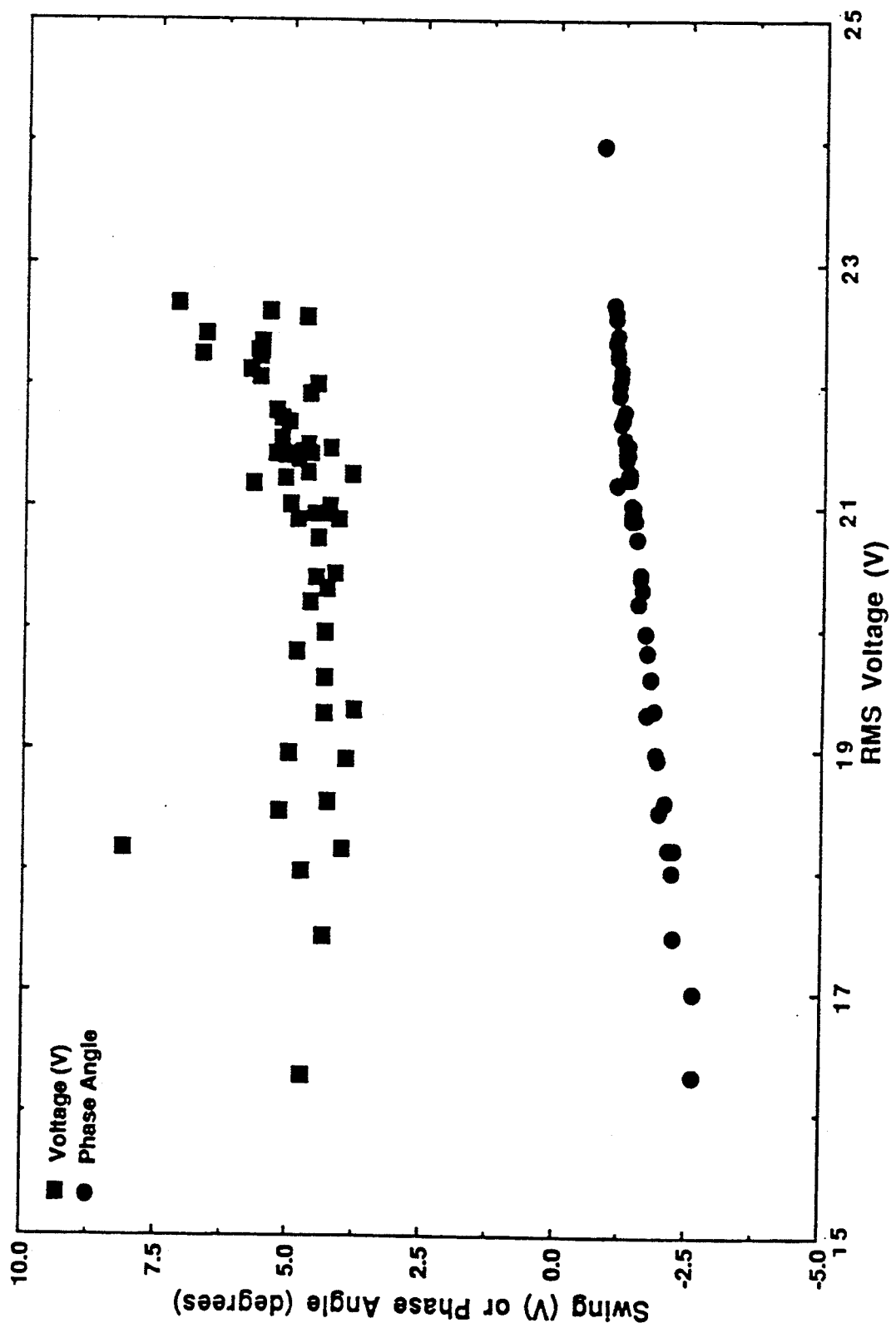
FIG. 4 is a graph comparing voltage swing and phase difference for a range of average melting voltages.

The data in FIGS. 2-4 were taken from an ESR furnace operating with the majority of the power being generated at 60 Hz. Hence, $\theta$ at 60 Hz was characterized and compared to the voltage signal. Both signals are shown in FIGS. 2 and 3 in a strip-chart form. At t=170 sec (approximate), the electrode was submerged 6 mm into the slag from its quasi-steady position (nominally 2 mm below the slag surface). The resulting changes to the voltage and phase difference signals are shown in FIGS. 2 and 3, respectively. By qualitative comparisons, the phase difference is a more sensitive and reliable indication of a change in electrode position. As further evidence of this fact, FIG. 4 compares the voltage swing versus phase difference over a range of melting voltages. As is evident, the amount of voltage swing varies significantly over the range of average voltages, whereas the phase difference is much more narrowly defined.

EXAMPLE 2

Figure 5:
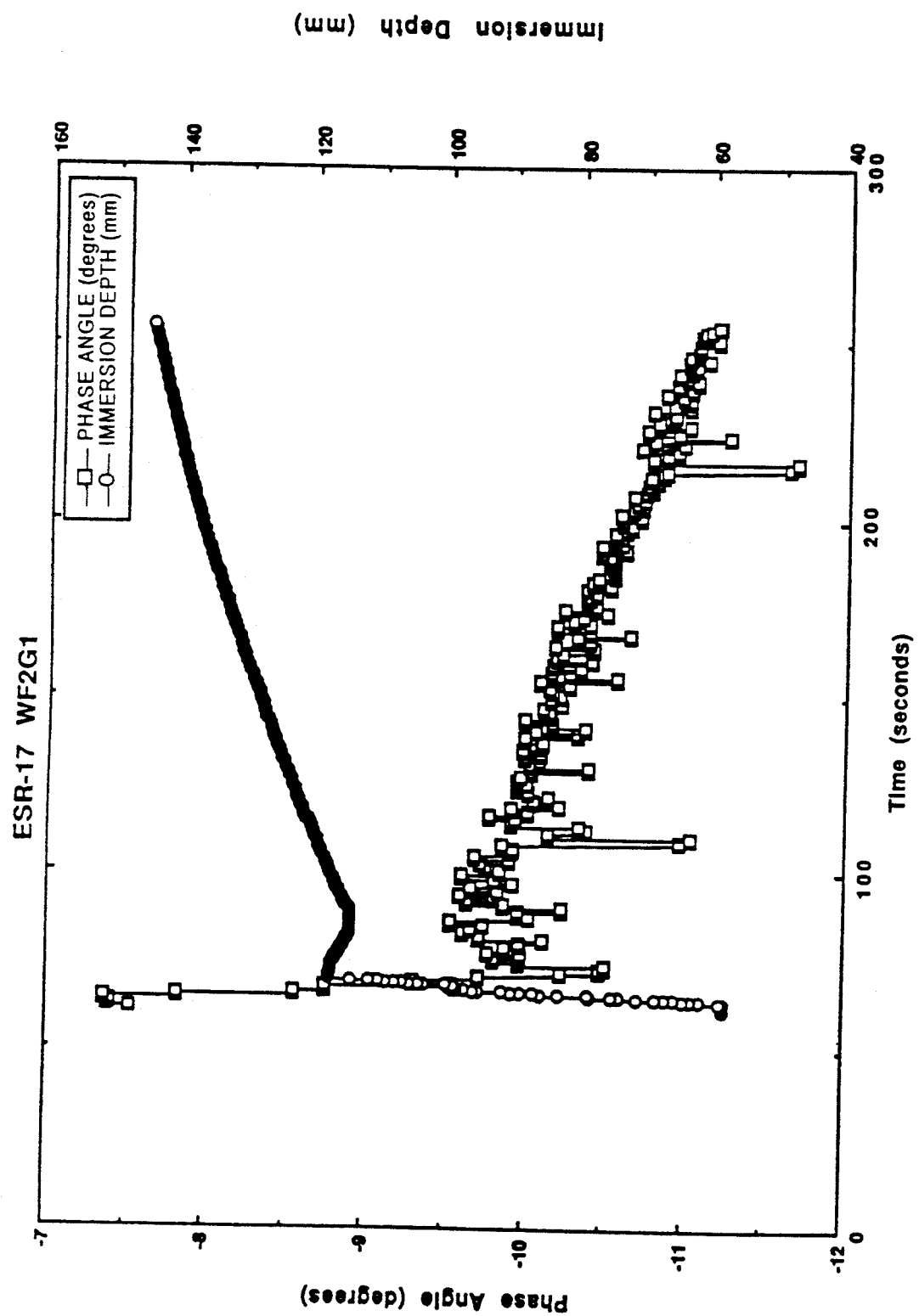
FIG. 5 is a graph showing changes in phase difference corresponding to large changes in electrode immersion depth during an electroslag remit.

FIG. 5 shows the changes in phase difference which accompany changes in electrode immersion depth over the range 55 mm to 145 mm. The electrode immersion depth changes were accomplished by manually driving the electrode downward, first rapidly (55 mm to 115 mm) and then more slowly. In both cases the phase difference functions as a clear indicator of immersion depth, having a signal-to-noise ratio of approximately 20 for this perturbation. Some random noise of greater amplitude appears in the phase difference signal at times of 105 seconds and 220 seconds, but this is due to the use of an extremely short signal averaging time, approximately 0.37 seconds. Use of phase difference as a control signal preferably would use a much longer signal averaging time to produce a more robust signal.

Figure 6:
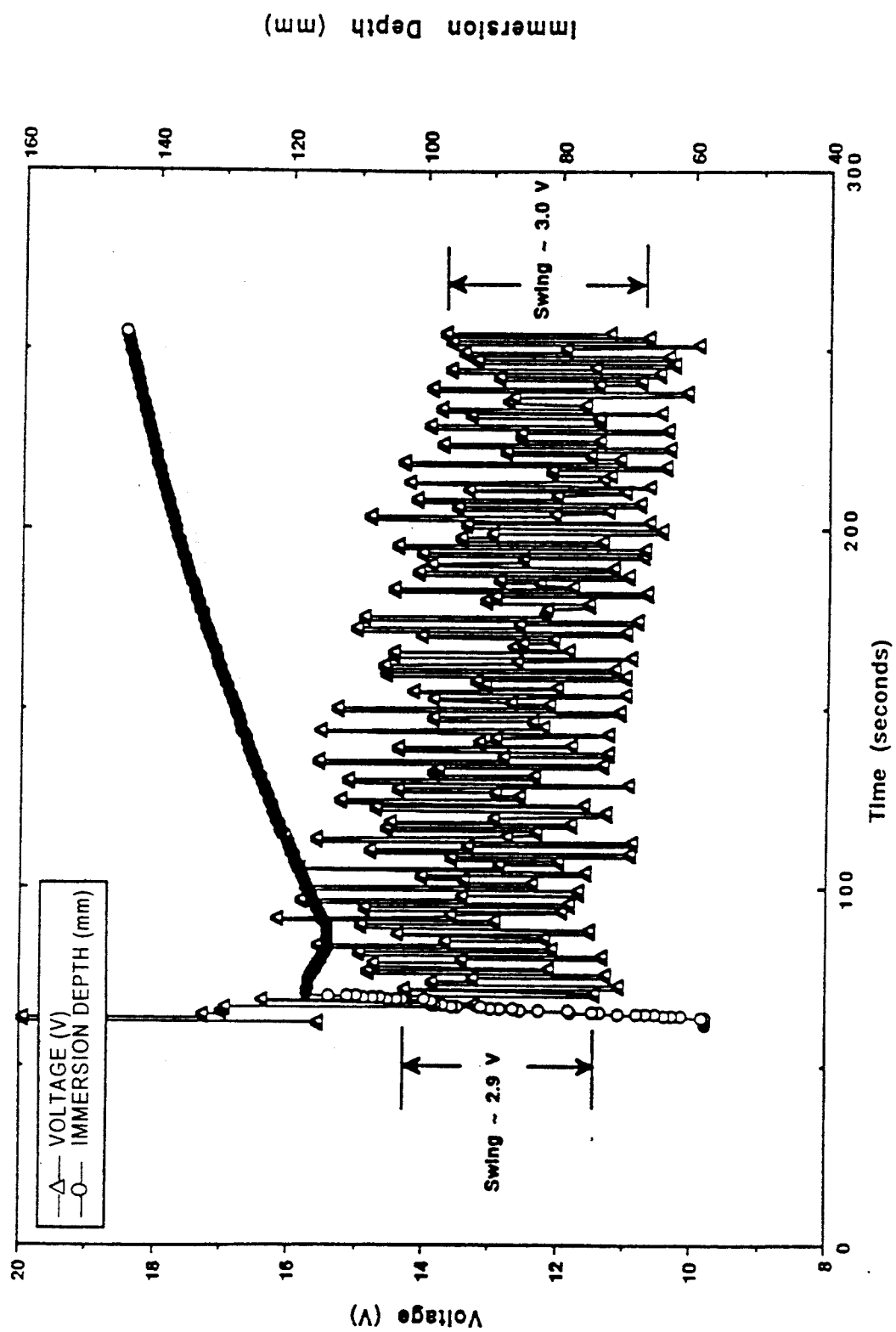
FIG. 6 is a graph showing changes in voltage and voltage swing for the same electroslag remelt as in FIG. 5.

FIG. 6 shows the changes that occur in voltage and voltage swing which accompany the electrode movement and immersion depth changes shown in FIG. 5. The voltage signal is much noisier than the phase difference signal, having a signal-to-noise ratio of approximately 2 for this perturbation. FIG. 6 also shows that the electrode displacement produces a negligible change in voltage swing, underscoring the fact that voltage swing cannot be used as a control signal at other than extremely small immersion depths.

The preceding examples can be repeated with similar success by substituting the generically or specifically described reactants and/or operating conditions of this invention for those used in the preceding examples.

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. A method for controlling electrode immersion depth in a slag pool of an electrode melting furnace, the method comprising the steps of:
   a) immersing the electrode in the slag pool;
   b) passing a current through the electrode and the slag pool;
   c) measuring at time intervals values of voltage and current to obtain power spectrum data for the current;
   d) using a control computer means to obtain a measure of phase difference based from imaginary and real components of said power spectrum data; and
   e) adjusting the electrode immersion depth in the slag pool according to the measured phase difference.

2. The method of claim 1 wherein the obtaining step d) comprises obtaining a measure of the phase difference from a selected frequency of the power spectrum data.

3. The method of claim 1 wherein the adjusting step e) comprises comparing the measure of phase difference to a predetermined phase difference.

4. The method of claim 3 additionally comprising the step of adjusting the predetermined phase difference at predetermined time intervals.

5. The method of claim 1 wherein the adjusting step e) comprises determining an adjustment by an adaptive bang-bang algorithm.

6. The method of claim 1 wherein the adjusting step e) comprises adjusting a voltage set point signal.

7. The method of claim 1 wherein the adjusting step e) comprises adjusting an electrode drive velocity signal.

8. The method of claim 1 wherein the adjusting step e) comprises maintaining the electrode immersion depth at a depth greater than 25 mm.

9. An apparatus for controlling immersion depth of an electrode in a slag pool of an electrode melting furnace, the apparatus comprising:
   means for measuring at time intervals values of voltage and current to obtain power spectrum data of an electrical circuit through the electrode and the slag pool;
   control computer means for obtaining a measure of phase difference based from imaginary and real components of spectrum data; and
   means for adjusting the electrode immersion depth in the slag pool according to the measure of phase difference.

10. The apparatus of claim 9 wherein said means for obtaining a measure of phase difference comprises means for obtaining a measure of phase difference from a selected frequency of the power spectrum data.

11. The apparatus of claim 9 wherein said adjusting means comprises means for comparing said measure of phase difference to a predetermined phase difference.

12. The apparatus of claim 11 wherein said adjusting means additionally comprises means for adjusting said predetermined phase difference at predetermined time intervals.

13. The apparatus of claim 9 wherein said adjusting means comprises means for determining an adjustment by an adaptive bang-bang algorithm.

14. The apparatus of claim 9 wherein said adjusting means comprises means for adjusting a voltage set point signal.

15. The apparatus of claim 9 wherein said adjusting means comprises means for adjusting an electrode drive velocity signal.

16. The apparatus of claim 9 wherein said adjusting means comprises means for maintaining the electrode immersion depth at a depth greater than 25 mm.

17. The apparatus of claim 9 wherein said adjusting means comprises software.

18. The apparatus of claim 9 wherein said adjusting means comprises firmware.

19. The apparatus of claim 9 wherein said adjusting means comprises a central processing unit.

20. The apparatus of claim 9 wherein said adjusting means is operably connected to an electrode melting furnace control panel.

* * * * *